(12) United States Patent
Dömens et al.

(10) Patent No.: US 6,439,333 B2
(45) Date of Patent: Aug. 27, 2002

(54) SENSOR SYSTEM AND METHOD FOR DETERMINING THE POSITION OF VEHICLE OCCUPANTS IN VEHICLES

(75) Inventors: Günter Dömens, Holzkirchen; Peter Mengel, Eichenau, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/816,936

(22) Filed: Mar. 23, 2001

(30) Foreign Application Priority Data

Mar. 23, 2000 (DE) ......................... 100 14 381

(51) Int. Cl.[7] ............................. B60R 21/32
(52) U.S. Cl. .............. 180/268; 280/735; 280/808; 701/45; 340/457.1
(58) Field of Search ................ 280/801.1, 808, 280/735; 180/268, 272; 701/45; 340/457.1, 436, 438

(56) References Cited

U.S. PATENT DOCUMENTS

| 3,133,277 A | * | 5/1964 | Hood | ...................... 123/198 D |
| 3,912,939 A | * | 10/1975 | Quantz et al. | ............... 180/269 |
| 4,885,566 A | * | 12/1989 | Aoki et al. | ............... 340/457.1 |
| 5,724,024 A | * | 3/1998 | Sonderegger et al. | .... 340/457.1 |
| 6,024,382 A | * | 2/2000 | Baumann | ..................... 180/268 |
| 6,203,059 B1 | * | 3/2001 | Mazur et al. | ............... 280/735 |

FOREIGN PATENT DOCUMENTS

| EP | 108 624 A2 | * | 6/2001 |
| JP | 10287202 A | * | 10/1998 |

* cited by examiner

Primary Examiner—Paul N. Dickson
Assistant Examiner—Ruth Ilan
(74) Attorney, Agent, or Firm—Laurence A. Greenberg; Werner H. Stemer; Ralph E. Locher

(57) ABSTRACT

In order to trigger an airbag in a differentiated way, the position of a vehicle occupant is determined in a way that is as immune to interference as possible. This is achieved by a distance measurement in which the seatbelt that is in contact with the vehicle occupant serves as an active reference position. The distance between the seatbelt and known points within the vehicle permits the position of the seatbelt and the vehicle occupant to be determined. The distance measurement is performed using magnetic field transmitter units and receiver units. The transmitter unit is preferably integrated into the belt.

24 Claims, 3 Drawing Sheets

SENSOR SYSTEM AND METHOD FOR DETERMINING THE POSITION OF VEHICLE OCCUPANTS IN VEHICLES

BACKGROUND OF THE INVENTION

Field of the Invention

The invention relates to a sensor system that enables the position of a vehicle occupant located in a vehicle to be determined relative to that vehicle. For this purpose, distance sensors are used which can sense the relative position of a vehicle occupant.

Most passenger cars today are equipped with so-called airbags. These inflatable airbags are currently triggered almost exclusively when a predefined acceleration or deceleration, usually measured on the vehicle, is exceeded. In this process it is not determined whether or not, for example, the vehicle occupant is located directly in front of the airbag or whether or not a seat in the vehicle is occupied. Furthermore, it is not possible to detect what type of occupant is in the seat, for example, whether the seat is occupied by a child, an adult or, a baby carrier. The airbag may thus be triggered even when the airbag is not necessary to protect anyone against injury. However, on the other hand, triggering of the airbag when the seat is not occupied in a usual way can lead to injury from the triggering of the airbag. An unusual occupation of the seat occurs, for example, if the vehicle occupant is located very close to the windscreen at a particular moment or also if a small child is located on the front passenger seat.

The situation occurring on a vehicle seat can be detected, for example, by visually sensing the vehicle occupant and by using image processing. The type of seat occupation and the position of the vehicle occupant, in particular of the front seat passenger, can thus be determined. With this visual sensing, it is necessary to record three-dimensional images and to operate completely independently of the ambient illumination. Such a system is enhanced by using a CMOS camera with three-dimensional resolution and with appropriate infrared laser illumination. This in turn results in problems in terms of the acceptance of the laser illumination. Furthermore, such optical systems are relatively complex and cost-intensive because of the required highly integrated chips, processors for the image processing, laser illumination with power electronics, and the appropriate optics. In addition, covering or soiling can severely disrupt optical systems.

SUMMARY OF THE INVENTION

It is accordingly an object of the invention to provide a sensor system and a method for determining the position of vehicle occupants in a vehicle which overcomes the above-mentioned mentioned disadvantageous of the prior art apparatus and methods of this general type. In particular, it is an object of the invention to provide such a sensor system that is immune to interference and that can be implemented in a cost-effective manner.

With the foregoing and other objects in view there is provided, in accordance with the invention, a sensor system for determining a position of an occupant in a vehicle. The sensor system includes a configuration having at least one elongated electrical conductor for generating at least one magnetic field that decreases in a direction transverse to the at least one electrical conductor. The sensor system includes at least one magnetic field sensor for detecting a strength of the at least one magnetic field in order to determine a distance between the at least one magnetic field sensor and the at least one elongated electrical conductor. A seatbelt has a portion configured to lie against a chest region of a vehicle occupant. The portion of the seatbelt includes one of the at least one elongated electrical conductor and the at least one magnetic field sensor. The other one of the at least one elongated electrical conductor and the at least one magnetic field sensor are configured at, at least one predetermined point in a vehicle such that a position of the vehicle occupant can be determined from a detectable relative position of the seatbelt.

With the foregoing and other objects in view there is also provided, in accordance with the invention, a method for determining information regarding an occupant in a vehicle. The method includes steps of: providing a configuration including at least one elongated electrical conductor for generating at least one magnetic field that decreases in a direction transverse to the at least one electrical conductor; providing at least one magnetic field sensor; providing a seatbelt having a portion configured to lie against a chest region of a vehicle occupant; configuring one of the at least one elongated electrical conductor and the at least one magnetic field sensor in the portion of the seatbelt; configuring the other one of the at least one elongated electrical conductor and the at least one magnetic field sensor in at least one predetermined point in a vehicle; detecting a strength of the at least one magnetic field to determine a distance between the at least one magnetic field sensor and the at least one elongated electrical conductor; and determining a position of the vehicle occupant from the distance between the at least one magnetic field sensor and the at least one elongated electrical conductor.

Hitherto there has been no differentiated triggering of an airbag in a vehicle, i.e. use has not been made of triggering conditions which provide more detailed information on the respective vehicle occupants. The inventive system first attempts to determine the position of vehicle occupants, and possibly also determines the type of seat occupation. The inventive system uses the seatbelt to obtain a reference position for a vehicle occupant on a specific seat to provide a simple, robust, and cost-effective sensor system which can sense both the position of the vehicle occupant relative to an airbag and the type of seat occupation. To do this, an elongated electrical conductor for generating a magnetic field is mounted in the portion of the seatbelt which rests against the chest region of a vehicle occupant. Various types of shaped coils (air-cored coils) woven into the belt are also conceivable. These magnetic field-generating units are preferably supplied with alternating current from one end of the seatbelt. The magnetic field, which decreases with increasing radius defined perpendicularly with respect to the longitudinal extent of the belt or the coil axis, can be detected by induction coils for example. The distance $d_A$ of a vehicle occupant away from the dashboard can therefore be detected by an induction coil using its output voltage $U_A$. This is due to the fact that a magnetic field H which is generated in the seatbelt by an electrical conductor decreases transversely with respect to its longitudinal extent as the radius increases, in accordance with the equation $H = I/2\pi r$, where I is the current. The field strength detected using the induction coil is a measure of the distance between the induction coil and seatbelt or electrical conductor. The distance $d_s$ between the seatbelt and an induction coil mounted to the rear of the vehicle occupant in the backrest can also be determined. In particular, this system can determine the type of seat occupation using the measured distance $d_s$. The type of seat occupation can be differentiated, for example, into large or small person, heavy or lightweight person etc.

Although the invention is illustrated and described herein as embodied in a sensor system for determining the position of vehicle occupants in vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
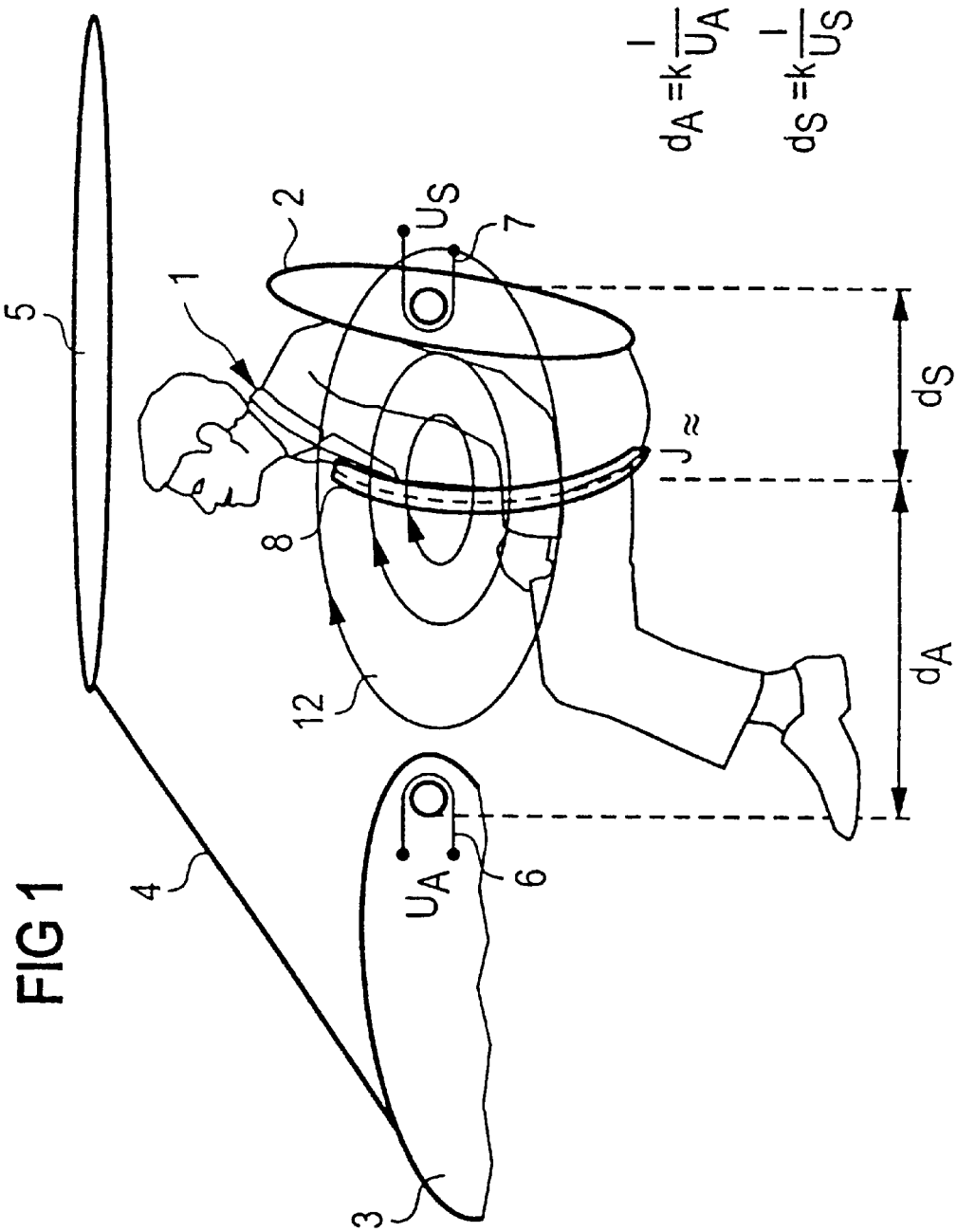
FIG. 1 shows a side view of a vehicle occupant positioned inside a vehicle.

Referring now to the figures of the drawing in detail and first, particularly, to FIG. 1 thereof, there is shown a partial side view of a motor vehicle illustrating parts of the vehicle such as the windshield 4, dashboard 3, vehicle roof 5 and backrest 2. The position of a vehicle occupant 1 is generally closely associated with the position of a seating surface (not illustrated) and the backrest 2, since the vehicle occupant 1 sits down on a vehicle seat and correspondingly rests back against it. However, within this general positioning, vehicle-occupant positions are possible which can entail certain disadvantages. In particular, when considering the functioning of airbags it is very important to know the precise position of a vehicle occupant relative to the airbag. Because the mobility of a vehicle occupant is generally greater in a forward direction than toward the side, and an airbag mounted, for example, on the dashboard, faces the front of a vehicle occupant, the operation of the airbag should be free of incorrect triggering. Furthermore, knowledge of the precise position of the vehicle occupant during the triggering process of an airbag could affect its triggering behavior.

An electrical conductor 11 (See FIG. 2) is configured in the seatbelt 8. This electrical conductor 11 generates a magnetic field 12 which decreases in a defined way, that is to say in a known way, transversely with respect to the longitudinal extent of the seatbelt or of the electrical conductor. Here, use is made of the fact that the seatbelt represents an active reference position for the vehicle occupant or for the front side of the vehicle occupant. This is carried out in a simple and cost-effective way and is not subject to any interfering influences whatsoever. The magnetic field 12 is measured at induction coils 6, 7 that are configured at known positions and the distance to the seatbelt 8 is determined from the magnetic field strength present there. To do this, the corresponding voltage profiles $U_A$, $U_S$ are detected and converted into a corresponding signal. The electrical conductor 11 contained in the seatbelt 8 is fed with a current I. The precise sitting position can thus be determined from the distance values which are determined, i.e. the distance $d_A$ between the seatbelt 8 and the dashboard 3, and the distance $d_S$ between the seatbelt 8 and the backrest 2.

After the vehicle occupant 1 rests against the backrest 2 for a relatively long period of time, and when there is a constant value for the distance $d_S$ for a relatively long period of time, it is possible to draw conclusions about the body size or the body diameter of the vehicle occupant. The type of seat occupation, for example adult or child, is thus differentiated. It is also conceivable to draw conclusions about the weight of the person.

In addition, the equations for calculating the two known distances are given in FIG. 1, k being a constant, where I is the current and $U_A$, $U_S$ are the voltages at the respective induction coils 6, 7.

Figure 2:
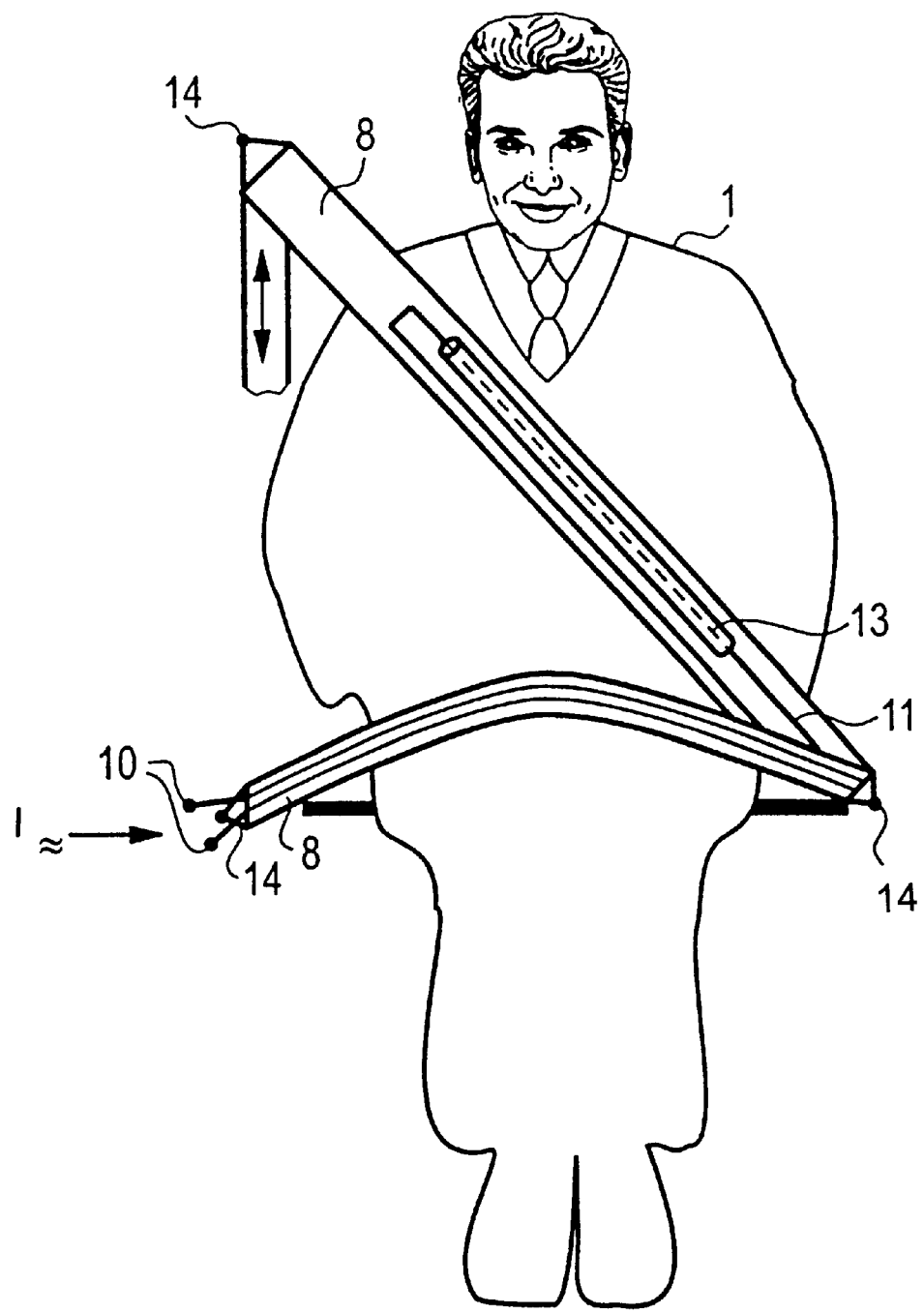
FIG. 2 shows a front view of a vehicle occupant who is protected with a seatbelt.

FIG. 2 shows a front view of a vehicle occupant 1 who is protected by a seatbelt 8. Extending in the seatbelt 8 is an electrical conductor 11 which is drawn in from one end, expediently from the lower end of the seatbelt 8. This electrical conductor 11 extends as far as a predefined point. It is then routed back to the end of the seatbelt 8. It is desirable to prevent the cancellation of the magnetic fields in the chest region as a result of the parallel routing back from the predefined point. In order to prevent the cancellation of the magnetic fields and to generate a defined field distribution, the electrical conductor 11 is shielded by a shield 13 in only one direction. Either the portion of the electrical conductor 11 that is routed forward or the portion of the electrical conductor 11 that is routed back is shielded, at least in the chest region. The other portion is unshielded in this region. The seatbelt 8 is not changed in terms of its design, i.e. with the attachments 14 and customary winding devices. Only electrical conductors 11 are drawn in. Their feed lines 10 for the power supply are led to the ends of the seatbelt 8, preferably to one end. The magnetic field 12 is generated by the conductor 11, which is preferably fed with an alternating current I.

Figure 3:
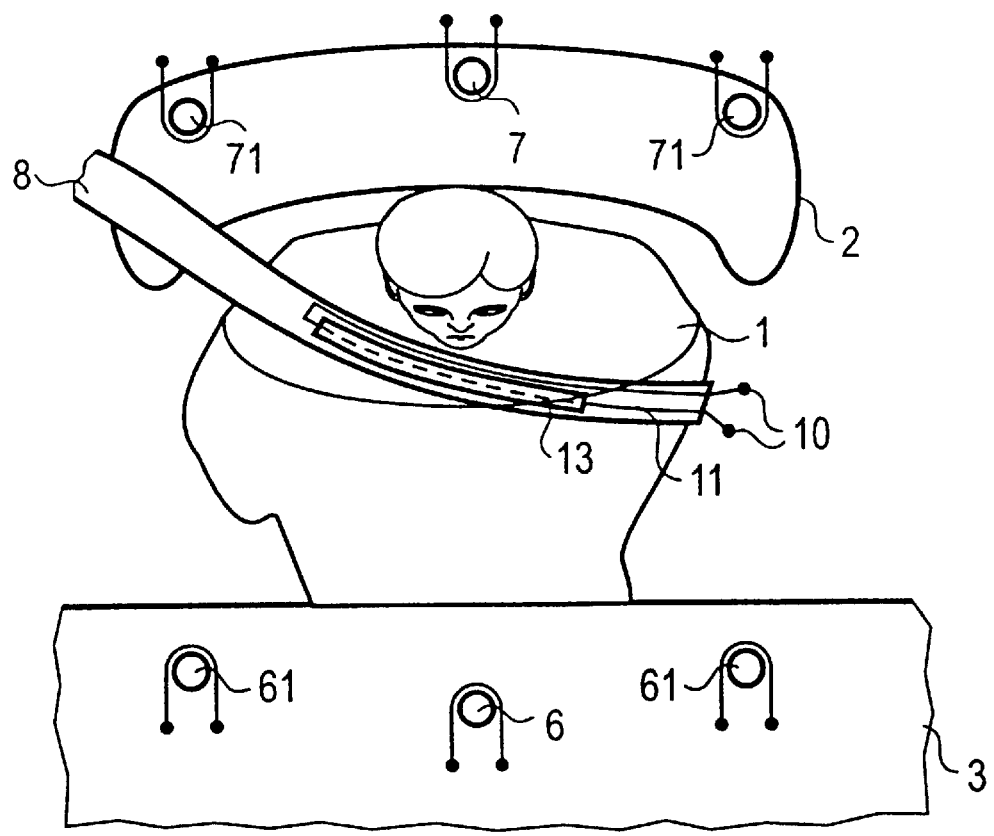
FIG. 3 shows a plan view of a vehicle occupant who is protected with a seatbelt and is resting against a backrest.

FIG. 3 shows the plan view of a vehicle occupant 1 who is resting against a backrest 2. A portion of the seatbelt 8 is illustrated. The region that is essential for safety considerations is the chest region of the vehicle occupant 1. The belt 8 is guided over the chest region and generally rests against the front of the body of the vehicle occupant 1. In FIG. 3, it is also made clear that the precise position of the vehicle occupant 1 corresponding to the illustrated plan view can be determined by an induction coil 6, 7 mounted, in the direction of travel. For example, an induction coil 6 mounted in front of the vehicle occupant 1 in the dashboard 3, or an induction coil 7 mounted behind the vehicle occupant 1 in the backrest 2. A lateral change in the position of the vehicle occupant 1 that goes beyond this can be detected by induction coils 61, 71 that are spaced apart laterally with respect to the direction of travel. Furthermore, it is conceivable to generate a plurality of magnetic fields 12 lying one on top of the other in order to differentiate the position of the front of a vehicle occupant 1, and to detect the magnetic fields 12. This could be carried out, for example, by drawing a plurality of electrical conductors 11 into the seatbelt 8, such that the zones in which the magnetic fields are formed are respectively positioned at different heights when a seatbelt 8 is worn. The locations of the seatbelt 8 can be determined within a plane, in particular a lateral, i.e. horizontal plane, by triangulation, for example, because the position of the measuring receivers, such as induction coils, are previously known. Any desired combinations of induction coils 6, 7 and 61, 71 are possible here. The seatbelt 8 serves in turn as a reference for the position of a vehicle occupant 1 and for the type of seat occupation. The distance of the seatbelt 8 or of the front of a vehicle occupant 1 from predefined fixed points in the vehicle is determined. It is thus possible to detect entirely whether the vehicle occupant 1 is resting against the backrest 2 in a normal position or is bending forward or is inclined laterally.

In order to ensure immunity to interference, the system can be operated with specific frequencies or combinations of various frequencies. Furthermore it is conceivable to bring about a defined change in a frequency or a magnetic field strength over time or to introduce coding for the system. Furthermore, pulse sequences can be used. The system can advantageously be operated with 40 MHz or else clocked in a predefined fashion.

In all of the embodiments, defined changes at the transmit end are to be defined as being previously known at the receive end.

It is also conceivable for further parameters which are determined externally to the system, for example the weight of a vehicle occupant 1, to be used for the differentiated triggering of an airbag.

We claim:

1. A sensor system for determining a position of an occupant in a vehicle, comprising:
   a configuration including at least one elongated electrical conductor for generating at least one magnetic field that decreases in a direction transverse to said at least one electrical conductor;
   at least one magnetic field sensor for detecting a strength of the at least one magnetic field in order to determine a distance between said at least one magnetic field sensor and said at least one elongated electrical conductor;
   a seatbelt having a portion configured to lie against a chest region of a vehicle occupant, said portion of said seatbelt including one of said at least one elongated electrical conductor and said at least one magnetic field sensor;
   the other one of said at least one elongated electrical conductor and said at least one magnetic field sensor being configured at at least one predetermined point in a vehicle such that a position of the vehicle occupant can be determined from a detectable relative position of said seatbelt.

2. The sensor system according to claim 1, wherein:
   said at least one electrical conductor is configured in said seatbelt; and
   said at least one magnetic field sensor is configured at said at least one predetermined point in the vehicle;
   said at least one predetermined point in the vehicle being, as viewed in a direction of travel, at a distance selected from the group consisting of a distance in front of the vehicle occupant and a distance behind the vehicle occupant.

3. The sensor according to claim 1, wherein a plurality of magnetic fields are configured one behind the other or one above the other along said seatbelt.

4. The sensor system according to claim 1, wherein it is possible to determine a position of the vehicle occupant relative to an airbag.

5. The sensor system according to claim 1, wherein it is possible to determine a body size of the vehicle occupant.

6. The sensor system according to claim 1, wherein said at least one elongated conductor includes a shielded current conductor portion routed in a first direction in said portion of said seatbelt and includes an unshielded current conductor portion routed in a second direction in said portion of said seatbelt such that the at least one magnetic field generated decreases in a defined way as a function of a distance from said seatbelt.

7. The sensor system according to claim 1, wherein it is possible to determine a type of seat occupation by determining a relative position of said seatbelt with respect to a specific part of the vehicle.

8. The sensor system according to claim 7, wherein said specific part is a backrest of the vehicle.

9. The sensor system according to claim 1, comprising two magnetic field sensors, wherein it is possible to determine a two-dimensional position of said seatbelt relative to the vehicle or to a vehicle seat by triangulation using said at least one electrical conductor and said two magnetic field sensors.

10. The sensor system according to claim 1, comprising an airbag, said at least one magnetic field sensor providing signals for actuating said airbag in dependence thereof.

11. The sensor system according to claim 10, wherein said airbag is actuated in dependence on a weight of the vehicle occupant.

12. The sensor system according to claim 1, wherein said at least one magnetic field sensor is an alternating current induction coil.

13. The sensor system according to claim 1, wherein said at least one elongated electrical conductor and said at least one magnetic field sensor are operated at an operating frequency in a 40 MHz range.

14. The sensor system according to claim 1, wherein said at least one elongated electrical conductor and said at least one magnetic field sensor are clocked.

15. The sensor system according to claim 1, wherein said at least one elongated electrical conductor and said at least one magnetic field sensor are operated in a coded fashion to increase immunity to interference.

16. A method for determining information regarding an occupant in a vehicle, which comprises:
   providing a configuration including at least one elongated electrical conductor for generating at least one magnetic field that decreases in a direction transverse to the at least one electrical conductor;
   providing at least one magnetic field sensor;
   providing a seatbelt having a portion configured to lie against a chest region of a vehicle occupant;
   configuring one of the at least one elongated electrical conductor and the at least one magnetic field sensor in the portion of the seatbelt;
   configuring the other one of the at least one elongated electrical conductor and the at least one magnetic field sensor in at least one predetermined point in a vehicle;
   detecting a strength of the at least one magnetic field to determine a distance between the at least one magnetic field sensor and the at least one elongated electrical conductor; and
   determining a position of the vehicle occupant from the distance between the at least one magnetic field sensor and the at least one elongated electrical conductor.

17. The method according to claim 16, which comprises:
   providing the at least one elongated electrical conductor as a plurality of elongated electrical conductors;
   configuring the plurality of the elongated electrical conductors in the seatbelt; and
   using the plurality of the elongated electrical conductors to generate a plurality of magnetic fields configured one behind the other or one above the other along the seatbelt.

18. The method according to claim 16, which comprises determining a position of the vehicle occupant relative to an airbag.

19. The method according to claim 16, which comprises determining a body size of the vehicle occupant.

20. The method according to claim 16, which comprises determining a type of seat occupation by obtaining a relative position of the seatbelt with respect to a specific part of the vehicle.

21. The method according to claim 16, which comprises actuating an airbag in dependence on a weight of the vehicle occupant.

22. The method according to claim 16, which comprises operating the at least one elongated electrical conductor and the at least one magnetic field sensor at an operating frequency in a 40 MHz range.

23. The method according to claim 16, which comprises clocking the at least one elongated electrical conductor and the at least one magnetic field sensor.

24. The method according to claim 16, which comprises operating the at least one elongated electrical conductor and the at least one magnetic field sensor in a coded fashion to increase immunity to interference.

* * * * *